United States Patent [19]
Hamby

[11] Patent Number: 5,979,518
[45] Date of Patent: Nov. 9, 1999

[54] TREE HARVESTING APPARATUS WITH TRANSVERSELY ACUTATED SAW CHAIN

[76] Inventor: Gary C. Hamby, 1672 Huffman Fork Rd., Purlear, N.C. 28665

[21] Appl. No.: 09/198,847

[22] Filed: Nov. 24, 1998

[51] Int. Cl.$^6$ ..................................................... A01G 23/08
[52] U.S. Cl. .......................... 144/34.1; 30/379.5; 83/928; 144/4.1; 144/335; 144/336
[58] Field of Search .................................... 30/379, 379.5; 83/928; 144/4.1, 34.1, 335, 336

[56] References Cited

U.S. PATENT DOCUMENTS

| | | | |
|---|---|---|---|
| 3,726,326 | 4/1973 | Coleman | 144/34.1 |
| 3,749,143 | 7/1973 | Hamilton . | |
| 3,896,862 | 7/1975 | Windsor | 144/4.1 |
| 3,970,125 | 7/1976 | Muirhead et al. | 144/4.1 |
| 4,116,249 | 9/1978 | Högberg et al. | 144/4.1 |
| 4,153,086 | 5/1979 | Oldenburg | 144/34.1 |
| 4,161,200 | 7/1979 | Albright | 144/34.1 |
| 4,219,059 | 8/1980 | Albright | 144/34.1 |
| 4,273,169 | 6/1981 | Baenen | 144/34.1 |
| 4,281,693 | 8/1981 | Moulson | 144/34.1 |
| 4,446,897 | 5/1984 | Kurelek | 144/34.1 |
| 4,552,191 | 11/1985 | Kuusilinna | 144/4.1 |
| 4,593,733 | 6/1986 | Hamilton | 144/34.1 |
| 4,690,185 | 9/1987 | Hamilton et al. | 144/34.1 |
| 4,848,424 | 7/1989 | Wiemeri et al. | 144/34.1 |
| 4,958,670 | 9/1990 | Johnson | 144/34.1 |
| 4,981,163 | 1/1991 | Westlund | 144/4.1 |
| 4,998,573 | 3/1991 | York | 144/34.1 |
| 5,103,881 | 4/1992 | Johnson | 144/34.1 |
| 5,441,090 | 8/1995 | Hill et al. | 144/4.1 |
| 5,709,254 | 1/1998 | Argue | 144/34.1 |
| 5,727,610 | 3/1998 | Isley | 144/4.1 |
| 5,735,323 | 4/1998 | Maloch | 144/34.1 |

*Primary Examiner*—W. Donald Bray
*Attorney, Agent, or Firm*—Jenkins & Wilson, P.A.

[57] ABSTRACT

There is disclosed a tree harvesting head assembly which provides an improved cutting means for permitting movement of a saw chain linearly outwardly from a first position behind a tree to be cut to a second position transversely forwardly of a tree to be cut. The cutting means in combination with the grapple means and engagement arms of the head assembly facilitates the harvesting of trees on rough terrain in an expedited and safe manner.

14 Claims, 6 Drawing Sheets

5,979,518

TREE HARVESTING APPARATUS WITH TRANSVERSELY ACUTATED SAW CHAIN

TECHNICAL FIELD

The present invention relates generally to a tree harvesting apparatus, and more particularly to an improved cutting mechanism for a tree harvesting apparatus comprising a saw chain that severs a standing tree by transversely cutting a tree engaged by the tree cutting apparatus from the back to the front of the tree.

RELATED ART

The tree handling and felling art is replete with many different types of tree harvesting apparatuses that possess many different types of improvements to their specific structure. Tree harvesting apparatus utilize a number of different types of cutting mechanisms including shear cutters wherein a pair of shear blades are pivoted on a frame and are moved between opened and closed positions; rotary cutters which are rotated about their own axis and are moved across the base of the tree by a drive mechanism; and chainsaws which may be mounted on a frame that is typically pivotably moveable with respect to a tree engaged by the tree harvesting apparatus incorporating the chainsaw as a cutting means. Yet another type of cutting means utilized by tree harvesting apparatus is known as a cable saw and comprises a flexible cable that supports a plurality of cutting elements. All of the cutting mechanisms of tree harvesting apparatus known to applicant to date suffer from shortcomings and disadvantages that are well known by those skilled in the tree harvesting art.

Prior patents of interest include U.S. Pat. No. 5,441,090 to Hill et al. that discloses a gripping apparatus for use in tree cutting and wood manipulation. The tree harvesting head is attached to an articulated boom and comprises opposing jaw members for gripping an object therebetween and a pivotably mounted cutting saw also mounted to the head.

U.S. Pat. No. 5,709,254 to Argue discloses a tree harvesting apparatus comprising a tree harvesting head having four gripping members and wherein a chainsaw assembly is retractably mounted between the gripping members of the tree harvesting head.

U.S. Pat. No. 4,273,169 to Baenen discloses a tree harvesting apparatus incorporating either one or two pivotably moveable cable saws that are actuated by drive means transversely through a standing tree in order to sever the tree adjacent its base.

U.S. Pat. No. 5,727,610 to Isley discloses a combined tree feller and processor having a head mounted to a boom with a 3-axis coupling. The head serves to engage a tree to be cut and a continuously rotating circular saw acts to sever the tree when urged therethrough. Also, U.S. Pat. No. 4,690,185 to Hamilton et al.; U.S. Pat. No. 4,593,733 to Hamilton; and U.S. Pat. No. 4,446,897 to Kurelek also describe tree felling heads which utilize rotary saw blades.

In view of the shortcomings in the various tree harvesting apparatuses that are known in the art, applicant has discovered a tree harvesting apparatus that is particularly advantageous for harvesting of trees on rough terrain and minimizing the danger associated with logging in the conventional methodology of chainsaws and pulling of cable to harvest trees on rough terrain.

DISCLOSURE OF THE INVENTION

In accordance with the present invention, applicant provides a tree harvesting head assembly for being mounted to the boom of an excavator or track hoe-type apparatus that comprises a frame pivotably mounted to the boom of the excavator or track hoe-type apparatus so as to be selectively tiltable from an upright position to an inverted position. Hydraulically actuated grapple means are mounted to the top of the upright frame for gripping a tree or log, and a pair of hydraulically actuated engagement arms are mounted to a medial position of the upright frame for engaging and holding the tree or log. Cutting means are mounted to the bottom of the upright frame for cutting a tree or log wherein the cutting means comprises a transversely extending saw chain entrained around a saw bar. The cutting means is slidably mounted on an outwardly extending guide means for guiding the saw bar and saw chain horizontally outwardly from a retracted first position behind the tree or log being held by the tree harvesting head assembly to an extended second position wherein the saw bar and saw chain have moved forward to traverse and sever the tree or log. Actuator means are operatively connected to the cutting means for motivating the saw bar and saw chain between the first and second positions.

It is therefore an object of the present invention to provide an improved tree harvesting head assembly adapted to be mounted on an excavator or track hoe or related type of vehicle.

It is another object of the present invention to provide an improved tree harvesting head assembly adapted for being mounted to the boom of an excavator or track hoe-type apparatus which can be used in the upright position to cut trees and pile the trees in bunches; which when tilted 90 degrees can be used as a heel boom loader for positioning trees and moving materials; and which when tilted 180 degrees into an upside down position can be used as a knuckle boom loader to remove trees from rough terrain.

It is another object of the present invention to provide an improved tree harvesting head assembly particularly adapted to fell trees with a chain bar saw in rough terrain wherein one motion can be used to cut trees, haul them away from the tree harvesting head assembly and without releasing the tree the grapple of the head assembly can position the tree on terrain for safe maneuvering by a rubber-tired skidder or the like.

It is still another object of the present invention to provide an improved tree harvesting head assembly for being mounted to the boom of an excavator or track hoe-type apparatus that facilitates the harvesting of trees on rough terrain and minimizes the dangers associated with logging by conventional methods including the use of chainsaws and the pulling of cable to harvest trees on rough terrain.

It is still another object of the present invention to provide an improved tree harvesting head assembly for being mounted to the boom of an excavator or track hoe-type apparatus that utilizes a novel chainsaw-type cutting means that is adapted to move transversely from a retracted first position behind a tree or log being held by the tree harvesting head assembly to an outwardly extended second position wherein the chainsaw has moved forwardly to traverse and sever the tree or log.

These and other objects of the invention will become more apparent with reference to the drawings described below.

BEST MODE OF CARRYING OUT THE INVENTION

Figure 4:
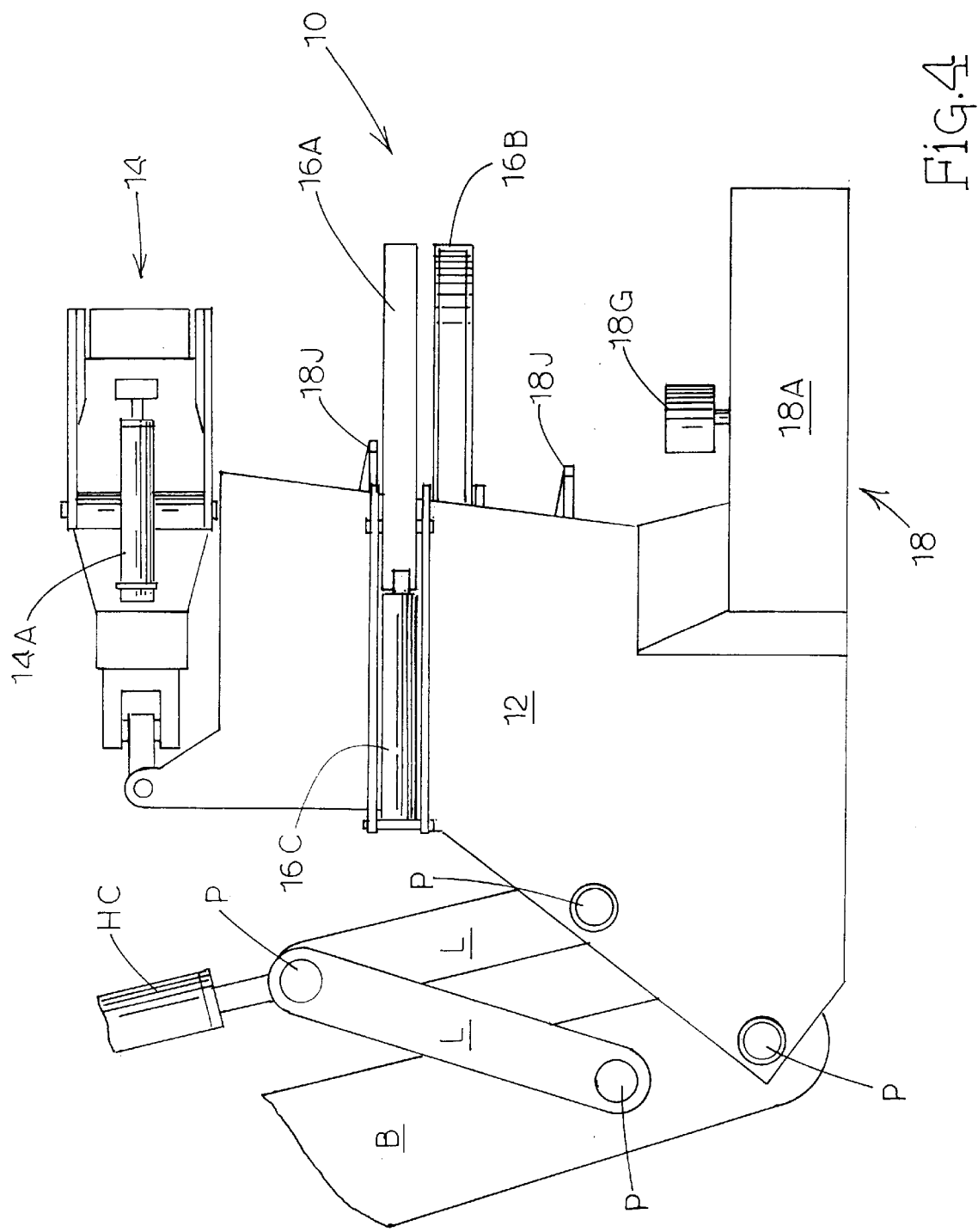
FIG. 4 is a left side elevation view of the tree harvesting head assembly in the upright position.
Figure 5:
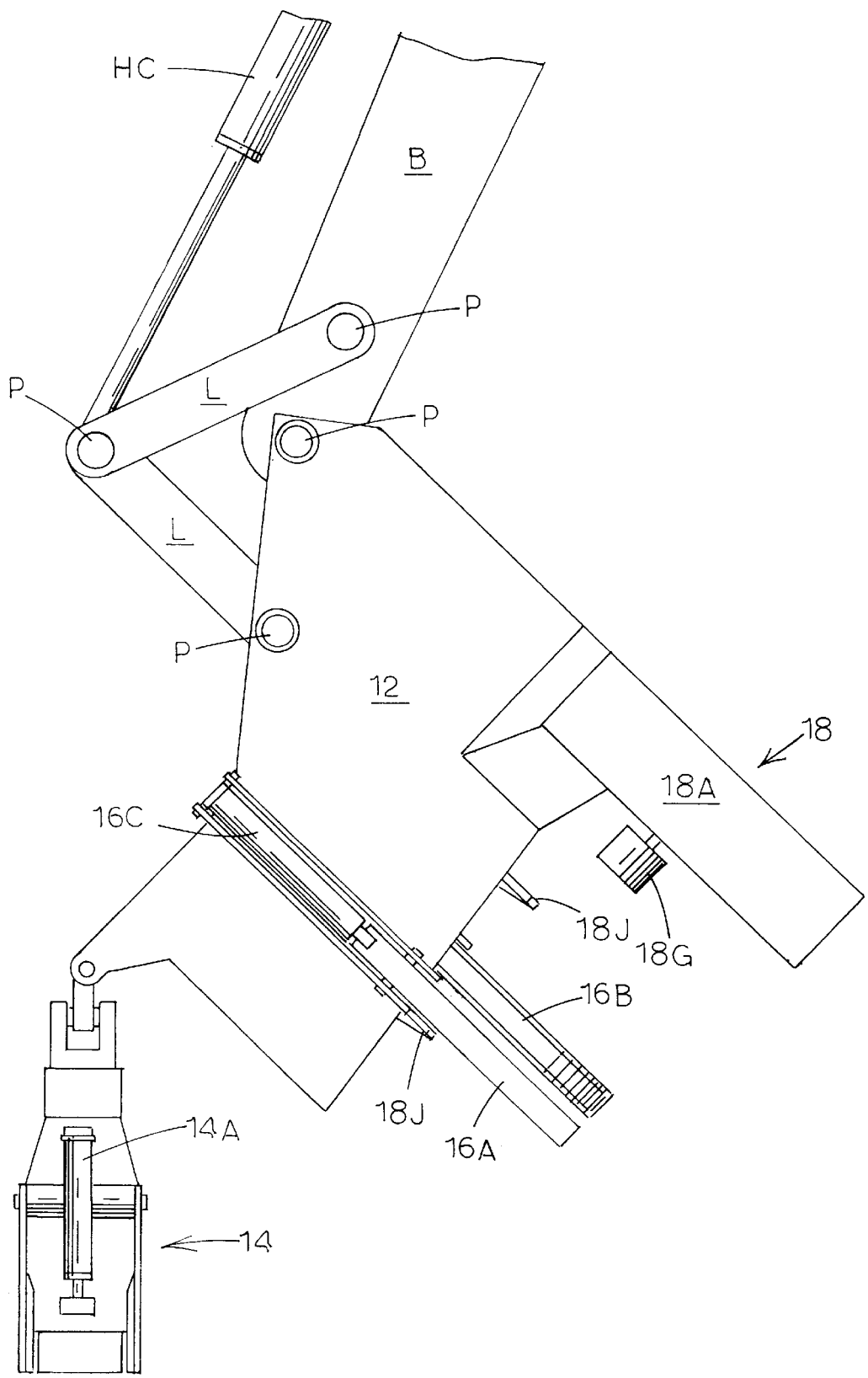
FIG. 5 is a left side elevation view of the tree harvesting head assembly similar to FIG. 4 wherein the tree harvesting head assembly has been substantially inverted into an upside down position.

Referring now to FIGS. 1–6 of the drawings, shown is the tree harvesting head assembly, generally designated 10, and attached to a vehicle V such as an excavator or track hoe-type apparatus. Vehicle V includes a main boom B that is moveable as known to one skilled in the art, and which is connected to tree harvesting head assembly 10 by means of the existing pins P and levers L conventionally used to tilt the bucket (which has been removed and replaced by head assembly 10) of vehicle V. By using pins P and levers L of the conventional hydraulic excavator or track hoe-type apparatus vehicle V, tree harvesting head assembly 10 can be actuated so as to pivot through an arc of up to about 180 degrees (or from an upright to an inverted position as seen in FIG. 4 and FIG. 5, respectively). Tree harvesting head assembly 10 is intended to be operated from the cab of vehicle V with conventional push button controls mounted on control sticks and with electric-over-hydraulic solenoid valves actuating all functions that were originally intended to operate the bucket (not shown) at the end of boom B.

Tree harvesting head assembly 10 is designed by applicant to be mounted on vehicle V so that when head assembly 10 is in the upright position it can be used to cut trees and pile the trees in bunches. When head assembly 10 is pivoted about 90 degrees it can be used as a heel boom loader for positioning trees and moving materials. When head assembly is further pivoted through a total arc of up to about 180 degrees into an upside down position (see FIG. 5) head assembly 10 serves as a knuckle boom loader to remove trees from rough terrain. As will be appreciated from the detailed description hereinbelow, tree harvesting head assembly 10 is designed to fell trees in rough terrain in one motion that serves to (1) cut the tree; (2) fell the tree away from vehicle V and tree harvesting head assembly 10; and (3) without releasing the felled tree to utilize the integral grapple to position the tree on the rough terrain so that a rubber-tired skidder can maneuver safely thereto. In this fashion, applicant's novel tree harvesting head assembly 10 in combination with conventional vehicle V facilitates the harvesting of trees on rough terrain and minimizes the danger associated with logging in the conventional manner with chainsaws and pulling cable.

Referring now specifically to FIGS. 2–5, tree harvesting head assembly 10 will be described in detail. Most suitably, head assembly 10 is constructed with frame 12 that is pivotably mounted in a conventional manner to the existing pins P and levers L at the remote end of boom B subsequent to removal of the bucket (not shown) from excavator or track hoe-type vehicle V. Frame 12 supports a pivotably mounted and conventional grapple generally designated 14. Grapple 14 is hydraulically actuated from open to closed position by a pair of double acting hydraulic cylinders 14A and 14B, and is pivotably mounted to the top of housing 12. Grapple 14 is a conventional, grapple that would be familiar to one skilled in the art and is similar to those shown in prior art references described hereinabove.

Also, frame 12 includes a pair of hydraulically actuated tree gripping arms 16A and 16B which are actuated from open to closed positions by corresponding double acting hydraulic cylinders 16C and 16D, respectively. Tree gripping arms 16A and 16B and operatively connected double acting hydraulic cylinders 16C and 16D operate in a conventional manner and are well known to those skilled in the art of tree harvesting apparatuses. Hydraulic cylinders 14A, 14B and 16C, 16D are fluidly connected to the conventional hydraulic hoses of vehicle V and carried by boom B so as to be connected at tree harvesting head assembly 10 in a conventional manner.

Figure 6:
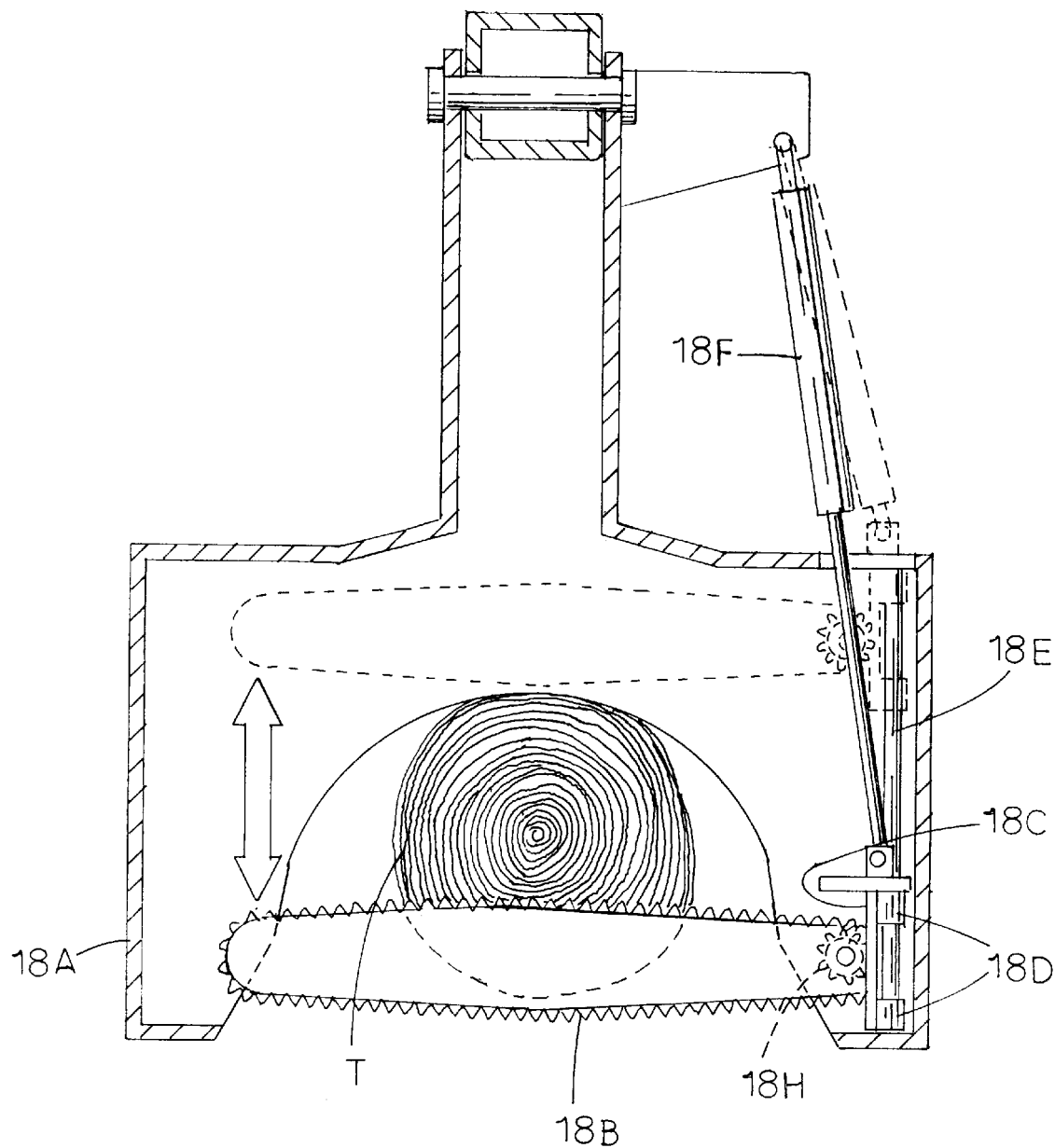
FIG. 6 is a longitudinal view of the cutting means of the tree harvesting head assembly taken in the direction of arrow 6—6 in FIG. 3 and illustrating movement of the chainsaw from the first retracted position behind a tree or log engaged by the head assembly to an extended second position wherein the chainsaw has moved forwardly to traverse and sever the tree or log.

Finally, tree harvesting head assembly 10 includes a novel cutting means, generally designated 18, that is mounted to the bottom of frame 12. Cutting means 18 can be best seen with reference to FIGS. 2 and 6 of the drawings. Cutting means 18 is formed of an open faced housing 18A that defines an arcuate outwardly faced aperture therein (see particularly FIGS. 2 and 6) for receiving substantially the full diameter of the base of a tree T that is engaged by tree harvesting head assembly 10. Cutting means 18 further includes a chainsaw 18B consisting of a saw bar and a saw chain that traverses endlessly therearound. Chainsaw (or bar saw) 18B is mounted at one end to a carriage 18C that includes two linear bearings 18D that are slidably mounted on a pair of corresponding parallel and spaced-apart rods 18E. As best seen in FIG. 6, carriage 18C will traverse along the length of rods 18E so as to move from a first retracted position within housing 18A of cutting means 18 to a second extended position at the front of housing 18A.

Carriage 18C supportingly engages one end of chainsaw 18B so as to transport chainsaw 18B from a retracted first position behind a tree to be severed (as shown in phantom lines in FIG. 6) to an extended second position wherein chainsaw 18B has moved forwardly and traversed tree T positioned within housing 18A of cutting means 18. Thus, it can be appreciated that chainsaw 18B is caused to move in a transverse and linear outward path from the back of housing 18A of cutting means 18 to the front of housing 18A of cutting means 18 in order to sever tree T supported within the opening of housing 18A from back to front. As will further be appreciated with particular reference to FIGS. 2, 3 and 6 of the drawings, carriage 18C of cutting means 18 is motivated along rods 18E by a double acting hydraulic cylinder 18F that is connected at the end of the piston arm to carriage 18C and at the other end of the cylinder to a flange extending from housing 18A. Double acting hydraulic cylinder 18F is also controlled from the cab of vehicle V along with previously referenced double acting hydraulic cylinders 16C, 16D and 14A, 14B. Further, a drive motor 18G is fixedly mounted to carriage 18C so as to drive chainsaw 18B by means of a drive shaft extending from motor 18G to sprocket 18H operatively located at the end of chainsaw 18B adjacent carriage 18C. Motor 18G can be any suitable electric or hydraulic motor for driving chainsaw 18B as known to one skilled in the art. Motor 18G traverses from the retracted position of chainsaw 18B to the extended position of chainsaw 18B by means of longitudinal slot 18I in housing 18A of cutting means 18. Finally, as a matter of preferred design, applicant contemplates providing a plate of gripping teeth 18J adjacent the back of the opening in housing 18A of cutting means 18, and at the front of housing 12 in substantial horizontal alignment with each of tree gripping arms 16A, 16B.

Applicant notes that the attachment of conventional lever arms L and pins P at the end of conventional boom B of excavator or track hoe-type apparatus vehicle V is accomplished in such a way as to selectively pivot head assembly 10 from an upright position as best seen in FIGS. 1–4 to a substantially inverted position as best shown in FIG. 5. Conventional double acting hydraulic cylinder HC of boom B is utilized to actuate pivotal movement of head assembly 10 from the upright to partially tilted and finally to fully inverted position by means of conventional controls in the cab of vehicle V.

Figure 1:
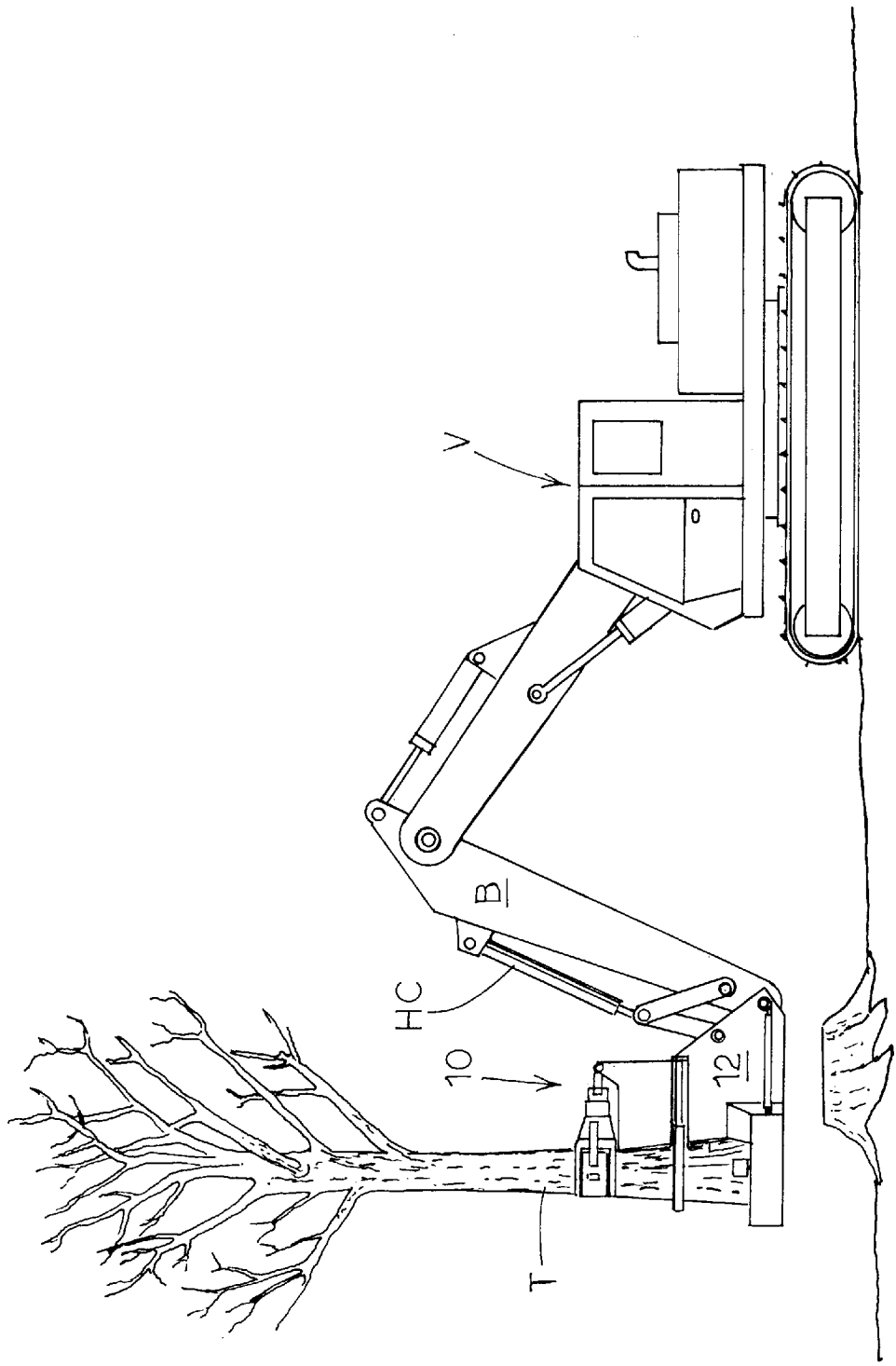
FIG. 1 is an overall perspective view of the tree harvesting head assembly of the present invention attached to a excavator or track hoe-type apparatus.
Figure 2:
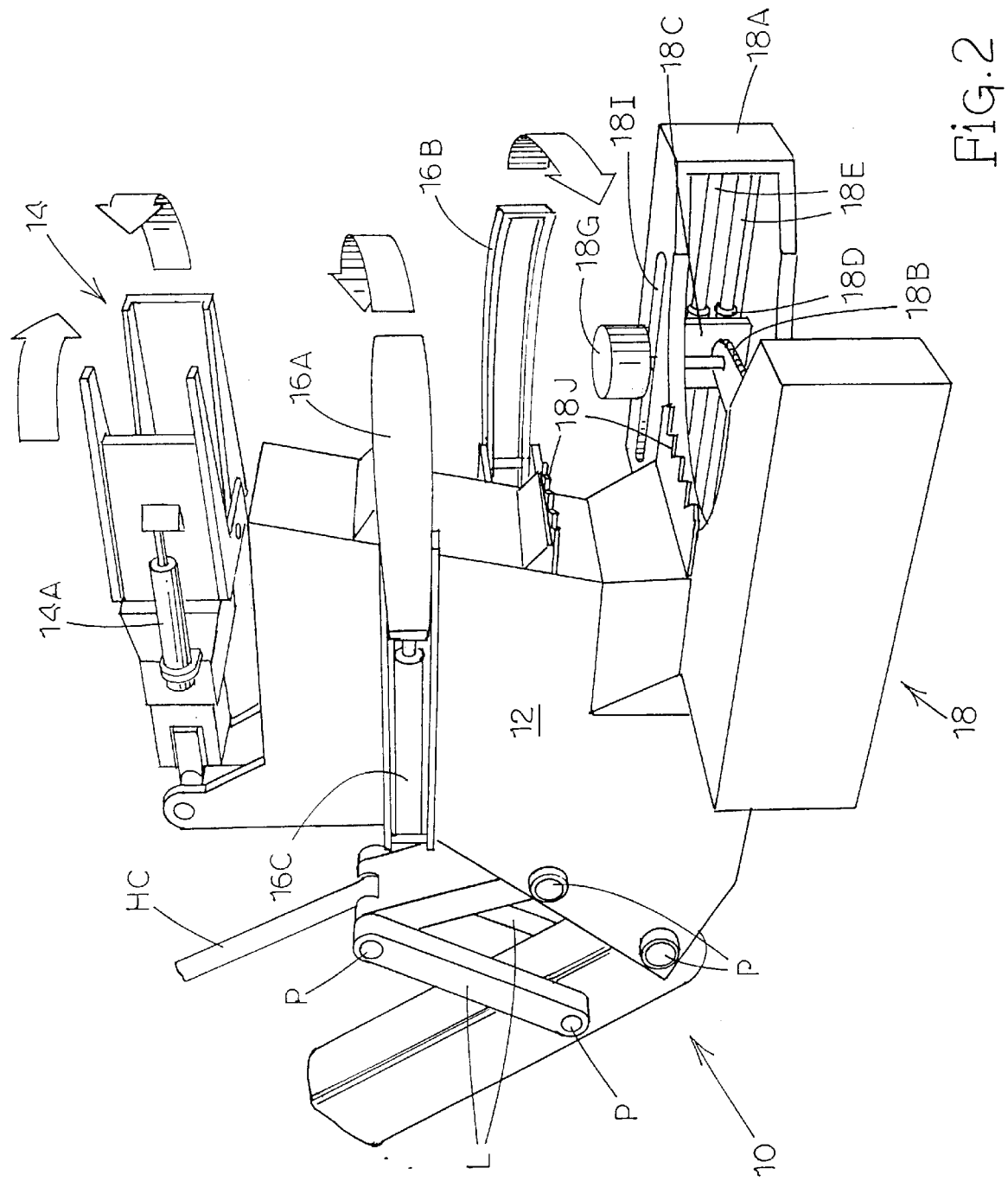
FIG. 2 is a front end perspective view of the tree harvesting head assembly.
Figure 3:
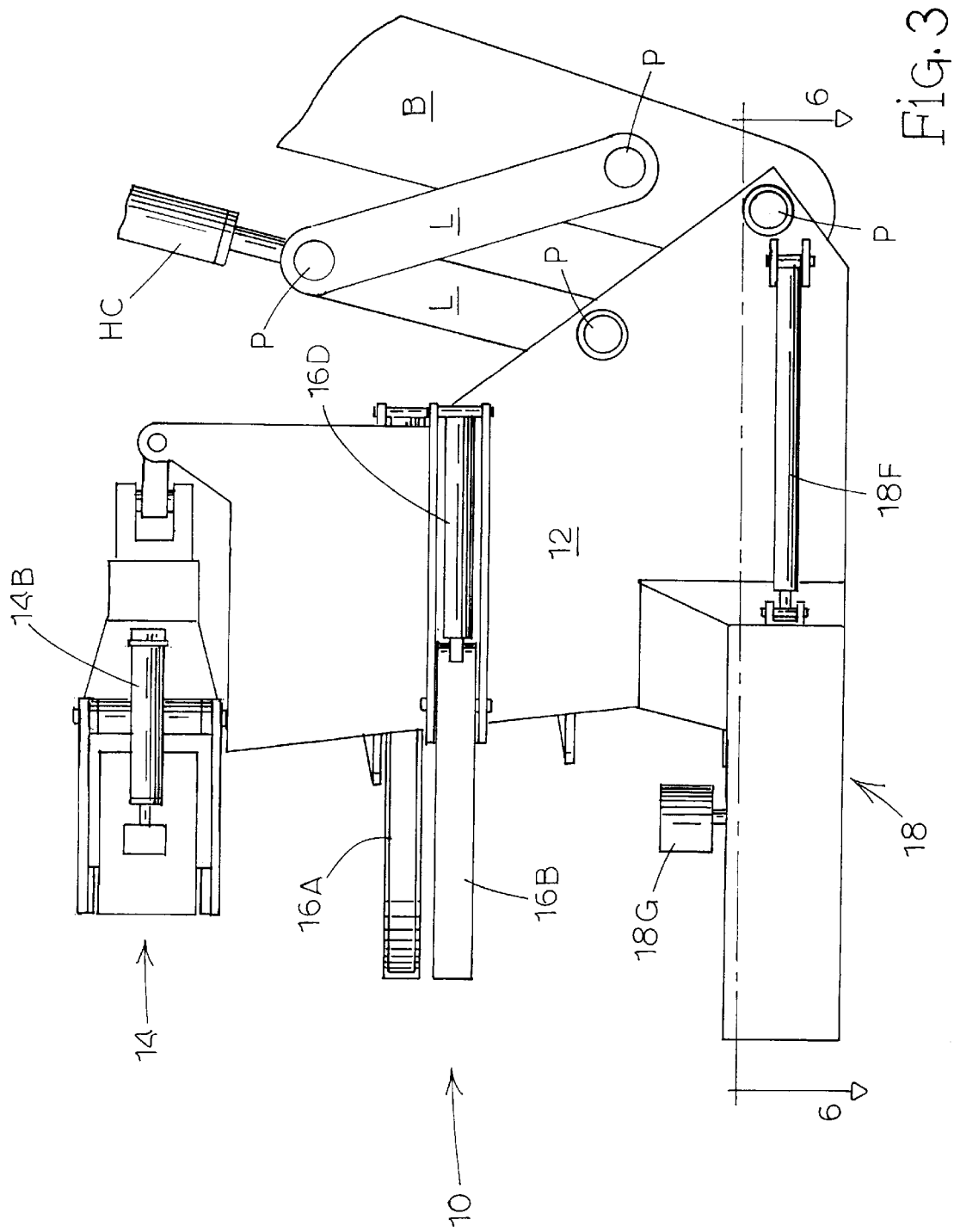
FIG. 3 is a right side elevation view of the tree harvesting head assembly in the upright position.

In use, in tree felling position one tree harvesting head assembly 10 is urged against a tree so as to push gripping teeth 18J into tree T, and tree gripping arms 16A and 16B and log grapple 14 are caused to engage tree T within head assembly 10 (see FIG. 1). In this initial position, chainsaw or bar saw 18B is actuated so as to sever tree T from the stump as shown in FIG. 1. When cutting trees up to about 20 inches in diameter, the operator of tree harvesting head assembly 10 will swing boom B of vehicle V by means of levers L in order to tilt head assembly 10 away from vehicle V. Tree gripping arms 16A and 16B are opened to release tree T and grapple 14 is then used to position tree T for easy access by a grapple skidder. Thereafter, tree T may be pulled through a conventional delimber.

When tree harvesting head assembly 10 is used for directionally felling trees with a diameter of about 20 inches to 30 inches, the operator will urge head assembly 10 against tree T so as to push gripping teeth 18J into the tree, close tree gripping arms 16A and 16B, and then tilt head assembly 10 slightly in order to push tree T away from vehicle V. The operator will then actuate bar saw or chainsaw 18B. The 90 degree angle of the chainsaw cut to the vertical axis of tree T will aid the directional felling of tree T by cutting from the vehicle side transversely through tree T to the remote side of the vehicle. As the tree falls, the tree can be pushed by tilting head assembly 10 until the tree reaches a safe angle. The operator will then release tree gripping arms 16A and 16B and allow tree T to fall. Thereafter, head assembly 10 can be tilted up to the full 180 degrees and grapple 14 used to place tree T for easy access by grapple skidders. When tree harvesting head assembly 10 is used to fell trees on rough terrain, head assembly 10 can be used to cut trees 20 feet above or below ground level as may be necessary.

While position one described above explains the use of tree harvesting head assembly 10 for tree felling, head assembly 10 can be used in a second position for bunching and heel loading. In this position, an operator can remove trees from rough terrain and position the trees for easy access, stock pile trees, separate different kinds and grades of trees, load whole trees on trailers, build log bridges across streams, and remove obstructions from streams so as to aid environmental timber harvesting.

Finally, tree harvesting head assembly 10 can be used in a third position for tree retrieval and log loading. The operator can remove trees from rough terrain, load log trucks, separate kinds and grades of logs, and aid in environmental work around streams. Furthermore, tree harvesting head assembly 10 can be used to saw off large limbs in top trees with bar saw or chainsaw 18B.

Applicant's novel tree harvesting head assembly 10 renders harvesting timber safer by reducing the time spent outside of vehicle V. Further, novel head assembly 10 aids in harvesting timber production by reducing saw hand and skidder operator fatigue and reducing the number of people necessary for timber harvesting. Further, head assembly 10 serves to keep the operator of vehicle V away from snakes, bees, brush, falling objects, and adverse weather conditions in order to further enhance productivity during tree harvesting. All of the advantages are enhanced by the novel cutting mechanism 18 of head assembly 10.

It will be understood that various details of the invention may be changed without departing from the scope of the invention. Furthermore, the foregoing description is for the purpose of illustration only, and not for the purpose of limitation—the invention being defined by the claims.

What is claimed is:

1. A tree harvesting head assembly for being mounted to the boom of an excavator or track hoe-type apparatus, comprising:

(a) a frame pivotably mounted to said boom of said excavator or track hoe-type apparatus so as to be selectively tiltable from an upright position to an inverted position;

(b) hydraulically actuated grapple means mounted to the top of said upright frame for gripping a tree or log;

(c) a pair of hydraulically actuated engagement arms mounted to a medial position of said upright frame for engaging and holding said tree or log;

(d) cutting means mounted to the bottom of said upright frame for cutting a tree or log, said cutting means comprising a transversely extending saw chain entrained around a saw bar, and said cutting means being slidably mounted on an outwardly extending guide means for guiding said saw bar and saw chain horizontally outwardly from a retracted first position behind said tree or log being held by said head assembly to an extended second position wherein said saw bar and saw chain have moved forward to traverse and sever said tree or log; and (e) actuator means operatively connected to said cutting means for motivating said saw bar and saw chain between said first and second positions.

2. A tree harvesting head assembly according to claim 1, in combination with an excavator or track-hoe type apparatus.

3. A tree harvesting head assembly according to claim 1, wherein said grapple means is actuated by at least one double acting hydraulic cylinder.

4. A tree harvesting head assembly according to claim 1, wherein said pair of engagement arms is actuated by at least one double acting hydraulic cylinder.

5. A tree harvesting head assembly according to claim 1, wherein said cutting means is driven by a motor mounted for slidable movement with said cutting means between said first and second positions.

6. A tree harvesting head assembly according to claim 1, wherein said cutting means is mounted within a housing defining an arcuate opening in the outwardly facing front portion thereof for receiving said tree or log therein and retaining said tree or log therein as said cutting means transversely cuts said tree or log from back to front.

7. A tree harvesting head assembly according to claim 6, wherein said housing includes gripping teeth adjacent at least a portion of the back surface of said arcuate opening of said housing to grip said tree or log.

8. In combination an excavator or track-hoe type apparatus and a tree harvesting head assembly for being mounted to the boom of an excavator or track hoe-type apparatus, said head assembly comprising:
   (a) a frame pivotably mounted to said boom of said excavator or track hoe-type apparatus so as to be selectively tiltable from an upright position to an inverted position;
   (b) hydraulically actuated grapple means mounted to the top of said upright frame for gripping a tree or log;
   (c) a pair of hydraulically actuated engagement arms mounted to a medial position of said upright frame for engaging and holding said tree or log;
   (d) cutting means mounted to the bottom of said upright frame for cutting a tree or log, said cutting means comprising a transversely extending saw chain entrained around a saw bar, and said cutting means being slidably mounted on an outwardly extending track for guiding said saw bar and saw chain horizontally outwardly from a retracted first position behind said tree or log being held by said head assembly to an extended second position wherein said saw bar and saw chain have moved forward to traverse and sever said tree or log; and
   (e) actuator means operatively connected to said cutting means for motivating said saw bar and saw chain between said first and second positions.

9. The combination according to claim 8, wherein said grapple means is actuated by at least one double acting hydraulic cylinder.

10. The combination according to claim 8, wherein said pair of engagement arms is actuated by at least one double acting hydraulic cylinder.

11. The combination according to claim 8, wherein said cutting means is driven by a motor mounted for slidable movement with said cutting means between said first and second positions.

12. The combination according to claim 8, wherein said cutting means is mounted within a housing defining an arcuate opening in the outwardly facing front portion thereof for receiving said tree or log therein and retaining said tree or log therein as said cutting means transversely cuts said tree or log from back to front.

13. The combination according to claim 12, wherein said housing includes gripping teeth adjacent at least a portion of the back surface of said arcuate opening of said housing to grip said tree or log.

14. A tree harvesting head assembly for mounting to the boom of a vehicular apparatus comprising:
   (a) a frame pivotably mounted to the boom and selectively rotatable 180 degrees from an upright position to an inverted position;
   (b) a pair of hydraulically actuated grapple members mounted to a top portion of the frame and movable between open and closed positions;
   (c) a pair of hydraulically actuated engagement arms mounted to a medial portion of the frame and movable between open and closed positions;
   (d) cutting means mounted to a bottom portion of the frame for cutting a tree or log, the cutting means including a transversely extending saw chain entrained around a saw bar and slidably mounted on guide means for guiding the saw bar horizontally outwardly from a retracted first position behind the tree or log being held by the head assembly to an extended second position wherein the saw bar moved forward to traverse and sever the tree or log; and
   (e) actuator means operatively connected to the cutting means for motivating the saw bar between the first and second positions.

* * * * *

UNITED STATES PATENT AND TRADEMARK OFFICE
CERTIFICATE OF CORRECTION

PATENT NO. : 5,979,518
DATED : November 9, 1999
INVENTOR(S) : Gary C. Hamby

It is certified that error appears in the above-indentified patent and that said Letters Patent is hereby corrected as shown below:

In both the Title and at the beginning of Column One (1), please delete "ACUTATED" and insert --ACTUATED--.

Signed and Sealed this

Sixteenth Day of May, 2000

Attest:

Q. TODD DICKINSON

Attesting Officer

Director of Patents and Trademarks